United States Patent
Hartmann et al.

(10) Patent No.: US 9,876,300 B2
(45) Date of Patent: Jan. 23, 2018

(54) FLUID CONDUIT

(71) Applicant: NORMA GERMANY GMBH, Maintal (DE)

(72) Inventors: Peter Hartmann, Aschaffenburg (DE); Olaf Kohlhaus, Langensalza (DE); Thomas Legel, Rodgau (DE)

(73) Assignee: NORMA GERMANY GMBH, Maintal (DE)

( * ) Notice: Subject to any disclaimer, the term of this patent is extended or adjusted under 35 U.S.C. 154(b) by 0 days.

(21) Appl. No.: 15/309,049

(22) PCT Filed: May 27, 2015

(86) PCT No.: PCT/EP2015/061705
§ 371 (c)(1),
(2) Date: Nov. 4, 2016

(87) PCT Pub. No.: WO2015/181235
PCT Pub. Date: Dec. 3, 2015

(65) Prior Publication Data
US 2017/0069992 A1    Mar. 9, 2017

(30) Foreign Application Priority Data

May 27, 2014 (DE) .................. 10 2014 107 433

(51) Int. Cl.
| | |
|---|---|
| *H01R 4/60* | (2006.01) |
| *H01R 13/00* | (2006.01) |
| *F16L 25/01* | (2006.01) |
| *H01R 4/64* | (2006.01) |
| *F16L 33/30* | (2006.01) |
| *H01R 13/648* | (2006.01) |

(52) U.S. Cl.
CPC ............ *H01R 13/005* (2013.01); *F16L 25/01* (2013.01); *H01R 4/646* (2013.01); *F16L 33/30* (2013.01); *F16L 2201/20* (2013.01); *H01R 13/6485* (2013.01)

(58) Field of Classification Search
CPC ........ H01R 13/005; F16L 27/11; F16L 33/01; F16L 33/003
USPC .................... 439/192; 285/226, 222.1–222.3
See application file for complete search history.

(56) References Cited

U.S. PATENT DOCUMENTS

| 4,405,969 A | 9/1983 | Swavely |
| 5,791,377 A | 8/1998 | LaRochelle |
| 6,494,497 B1 * | 12/2002 | Kertesz ............... F16L 25/0045 285/222.1 |

(Continued)

FOREIGN PATENT DOCUMENTS

| DE | 3543233 | 6/1987 |
| DE | 19831898 | 1/2000 |
| DE | 10 2005 021 915 | 12/2005 |

(Continued)

*Primary Examiner* — Phuong Chi T Nguyen
(74) *Attorney, Agent, or Firm* — Greenblum & Bernstein, P.L.C.

(57) ABSTRACT

Disclosed is a fluid conduit (1) comprising a pipe (2) and a conduit connector (3) which is connected to the electrically conductive pipe (2). In order to be able to keep the risk associated with electricity being on the fluid line as low as possible with little effort, an electrical connecting element (9) which is electrically connected to the pipe (2) is provided in the region of the conduit connector (3).

12 Claims, 1 Drawing Sheet

(56) References Cited

U.S. PATENT DOCUMENTS

2012/0161434 A1    6/2012  Wells

FOREIGN PATENT DOCUMENTS

| DE | 10 2010 060 209 | 5/2012 |
| DE | 10 2012 112 563 | 6/2013 |
| JP | H08-270845 | 10/1996 |

* cited by examiner

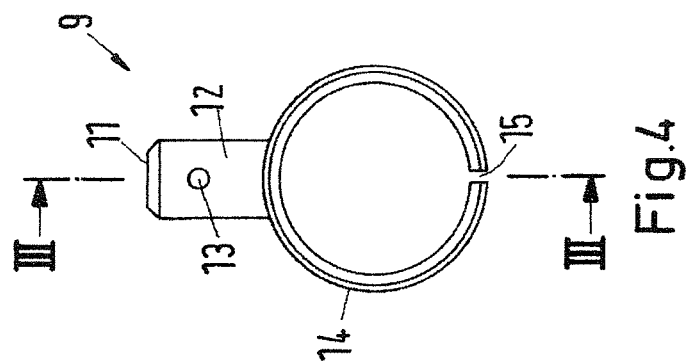
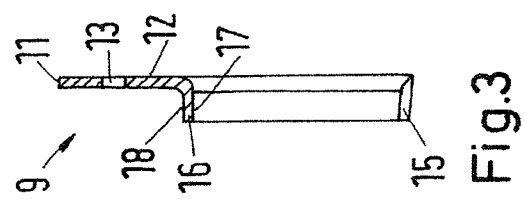
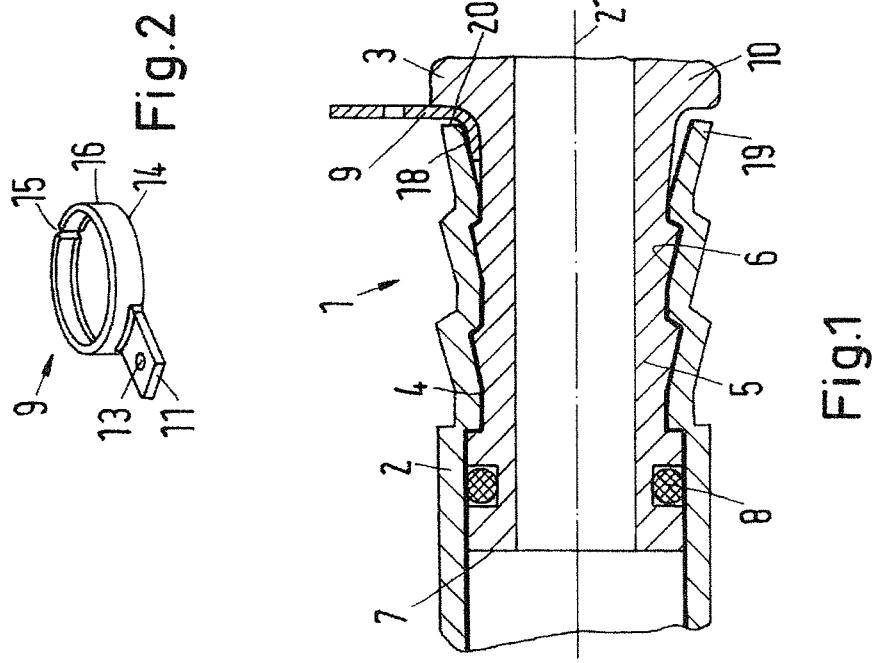

FLUID CONDUIT

The invention relates to a fluid conduit comprising a pipe and a conduit connector connected to the pipe, wherein the pipe is designed to be electrically conductive.

A fluid conduit which is designed to be electrically conductive is, for example, known from DE 198 31 898 A1. Such a fluid conduit is used, for example, for fuels and fuel vapors. With the electrical conductivity of the pipe it is desired to ensure that electrical charges can be removed, with the result that, for example, the risk of spark formation can be kept low.

DE 10 2012 112 563 A1 discloses a custom-made fluid conduit which has an inner conductive layer. This conduit is connected to a conduit connector, specifically in such a way that the inner conductive layer is electrically conducted to the conduit connector parts. The conduit connector parts are covered by an electrically insulating, in particular cap-like covering. The protective cap serves as a contact protector to prevent a person from receiving an electric shock when contacting a conduit connector part.

The object on which the invention is based is to keep the risks caused by electricity on the fluid conduit small with little effort.

This object is achieved in the case of a fluid conduit of the type specified at the outset in that an electrical connecting element which is electrically connected to the pipe is provided in the region of the conduit connector.

In many cases, it is not possible to avoid a situation in which, for example, a through-flowing fluid causes electrical charges to be produced on the pipe. These electrical charges can flow, that is to say change their position, on account of the electrical conductivity of the pipe. However, if the conduit connector is designed to be not electrically conductive, the charges can flow only as far as the conduit connector, with the result that there is the risk here that an undesirably high voltage builds up. Although the conduit connector can also be designed to be electrically conductive, the choice of possible conduit connectors is limited. The electrical connecting element now affords a possibility of removing the electrical charges or in general the electricity from the fluid conduit. Owing to the electrically conducting connection from the pipe to the connecting element, the charges can be transferred to the connecting element and removed from there without problem. The connecting element is provided in the region of the conduit connector. This has a number of advantages. On the one hand, there is increased mechanical stability in the region of the conduit connector, with the result that the connecting element can be reliably mounted and kept in position. On the other hand, handling during mounting is required in any case in many cases in the region of the conduit connector, with the result that the connecting element can readily be provided here with means by which the electricity from the pipe and thus from the fluid conduit can be removed.

In this case, it is preferred that the connecting element has an outwardly guided electrical contact. Such a contact makes it possible to connect an electrical line through which the connecting element can be connected to a ground potential, for example. Charges which develop on the fluid conduit can then be removed via the electrical contact.

The conduit connector preferably has a connecting piece onto which the pipe is plugged, wherein the connecting element is arranged on the connecting piece. The connecting piece can have, for example, a "fir tree" structure on its outer side. Other designs are possible. There is sufficient installation space in the region of the connecting piece to be able to position the connecting element here.

In this case, it is preferred that the connecting element has a ring which surrounds the connecting piece. Consequently, mounting the connecting element is relatively simple. It is only required to push the connecting element onto the connecting piece in order to mount the connecting element on the conduit connector. The mounting work necessary for this thus requires relatively little additional effort.

The ring preferably has an interruption in the circumferential direction, wherein the ring has a nominal diameter which is smaller than an outside diameter of the connecting piece. The nominal diameter is the inside diameter of the connector in the non-plugged-on state. The interruption makes it possible for the ring to be widened somewhat during mounting on the connecting piece. This widening is obtained automatically because the nominal diameter of the ring is smaller than the outside diameter of the connecting piece. After mounting has taken place, the ring is then held with a certain internal stress on the connecting piece. The prerequisite for this is only that the ring is elastically deformable to at least a slight extent.

The ring preferably takes the form of a hollow cylinder. The ring thus has an at least small extent parallel to the axis of the connecting piece. Consequently, the stability with which the ring is seated on the connecting piece is increased. The axial length of the hollow cylinder is preferably greater than the thickness of the radial wall of the hollow cylinder.

The hollow cylinder preferably has a conical inner shape. This conical inner shape can be tailored to the outer shape of the connecting piece, for example when the connecting piece has a fir tree structure on its outer side.

In a preferred embodiment, there is provision that the connecting element is arranged at an end side of the pipe between the pipe and the conduit connector. In this case, the connecting element is mounted before the pipe is pushed onto the connecting piece. Positioning the connecting element between the end side of the pipe and the conduit connector has the effect that the connecting element is held on the connecting piece in a clearly defined position parallel to the axis of the connecting piece. Displacement parallel to this direction is virtually not possible.

The pipe is preferably electrically conductive at least on its inner side and the connecting element is electrically connected to the inner side. Consequently, electrical resistances between the pipe and the connecting element are kept low. The transfer of charges from the pipe to the connecting element is readily possible.

An electrical connection preferably extends between the connecting element and the inner side of the pipe over the outer side of the conduit connector. If the outer side of the conduit connector is made electrically conductive, charges can then pass from the pipe over the outer side of the conduit connector to the connecting element and then be transferred into the connecting element. Such an electrical connection can in principle also be produced in the case of conduit connectors which are not electrically conductive per se, for example by applying an electrically conductive layer.

In an alternative or additional embodiment, there is provision that the pipe at least partially surrounds the connecting element. This is particularly possible when the connecting element has a ring which has a certain axial extent, that is to say an extent parallel to the axis of the connecting piece. In this case the pipe is pushed simply onto the ring or onto the axial continuation of the ring, with the result that the electrical connection between the pipe and the connecting element can be established without additional effort.

In this case, it is preferred that the connecting element has a plug-on region whose outside diameter widens conically. Owing to the conical widening of the plug-on region, the pipe is widened when plugged onto the plug-on region and is then seated with a certain internal stress on the plug-on region. This internal stress is afforded by the elastic properties of the pipe. The internal stress produces a certain contact pressure of the pipe on the plug-on region and thus relatively good electrical contact between the pipe and the connecting element.

The connecting element preferably has a flat plug. A flat plug, for example in accordance with DIN 46244, can be used without problem to connect an electrical line.

The invention will be described hereinbelow with reference to a preferred exemplary embodiment in conjunction with the drawing, in which:

FIG. 1 shows a schematic illustration of a detail of a fluid conduit,

FIG. 2 shows a perspective illustration of a connecting element,

FIG. 3 shows a section III-III according to FIG. 4, and

FIG. 4 shows a front view of a connecting element.

FIG. 1 shows a detail of a fluid conduit 1. The fluid conduit 1 has a pipe 2 and a conduit connector 3. The term "pipe" 2 is to be understood generally here. It can be a rigid pipe or a flexible pipe or a hose. Further designs are possible.

The pipe 2 has an electrically conductive layer 4 on its inner side. As an alternative to this, the pipe 2 can also be electrically conductive overall.

The conduit connector 3 has a connecting piece 5 with a fir tree profile 6 on its outer side. The pipe 2 is pushed onto the connecting piece 5. The pipe 2 is elastic to a certain extent, i.e. it can hug the fir tree profile 6 of the connecting piece 5 and then likewise forms a kind of fir tree profile on its radial outer side.

The pipe 2 is pushed from one end 7 of the connecting piece 5 onto the connecting piece 5. A sealing ring 8 is arranged in the region of this end 7 in order to ensure reliable sealing between the connecting piece 5 and the pipe 2. Such a sealing ring is not required in all cases.

An electrical connecting element 9 is placed on the connecting piece 5. The electrical connecting element is situated as far as possible away from the end 7 such that it butts against a housing part 10 of the conduit connector 3 and bears against the housing part 10.

The connecting element 9 is illustrated with further details in FIGS. 2 to 4.

The connecting element 9 has an outwardly guided electrical contact 11 in the form of a flat plug 12. The flat plug has a through-opening 13 which can be used to improve a fastening of a cable lug. The connecting element 9 is formed overall from an electrically conductive material, for example from a metal, such as copper or steel. The connecting element 9 is designed to be elastically flexible to a certain extent.

The connecting element 9 has a ring 14 which has an interruption 15 in the circumferential direction. The ring 14 takes the form of a hollow cylinder 16 which, as can be seen in FIG. 3, has a conical inner shape 17, wherein the hollow cylinder 16 preferably has an axial length which is greater than its radial wall thickness. The inner shape 17 is tailored to an outer shape of the connecting piece 5 in the region where the connecting element 9 is arranged on the connecting piece 5. If the connecting piece 5 has the fir tree profile 6 illustrated, a slight conical widening of the outer side of the connecting piece 5 can then also be observed as a rule shortly ahead of the housing part 10.

The ring 14 has on its radial outer side a plug-on region 18 which widens conically toward the housing part 10.

As can be seen in FIG. 1, the pipe 2 is pushed onto the plug-on region 18, with the result that the electrically conductive layer 4 comes to lie on the outer side of the ring 14 in the region of the plug-on region 18. Here, the pipe 2 is somewhat widened at its end 19 which is adjacent to the housing part 10, with the result that the pipe 2 is arranged, in the region of the end 19, with a certain radial stress on the ring 14. This results in a relatively large contact pressure between the inner side of the pipe 2 and the connecting element 9 and thus an excellent electrical contact.

In a manner which is not illustrated in further detail, it is also possible in any event for the conduit connector 3 to be made electrically conductive in the region of the connecting piece 5 such that electricity can pass over the outer side of the conduit connector from the pipe 2 to the connecting element 9. The electrical conductivity can be formed, for example, by an electrically conducting layer, such as a lacquer.

The connecting element 9 is arranged between an end side 20 of the pipe 2 and the conduit connector 3, to be more precise the housing part 10 of the conduit connector 3. Consequently, the connecting element is additionally fixed in the axial direction, i.e. a direction parallel to the axis 21 of the connecting piece 5.

The production of such a fluid conduit is relatively simple. Before the pipe 2 is pushed onto the connecting piece 5, the connecting element 9 is pushed by its ring 14 onto the connecting piece 5 until it reaches the housing part 10. The pipe 2 is then pushed onto the connecting piece 5 to such an extent that its end 19 passes over the plug-on region 18 and hugs the plug-on region 18 of the ring 14 with a certain internal stress. The conduit connector is thus basically completed. If required, it can be encapsulated with a sealing compound which is not illustrated in further detail, with it of course being necessary for the electrical connecting element 9 to project from the sealing compound.

If required, the connecting element can also be mechanically interlocked with the connecting piece 5 or the housing part 10 or be positively connected in some other way in order to prevent twisting.

The invention claimed is:

1. A fluid conduit comprising:
   a pipe designed to be electrically conductive;
   a conduit connector connected to the pipe; and
   an electrical connecting element, which is electrically connected to the pipe, is provided in a region of the conduit connector,
   wherein the electrical connecting element has a ring which surrounds a connecting piece of the conduit connector and the ring has an interruption in the circumferential direction.

2. The fluid conduit as claimed in claim 1, wherein the electrical connecting element has an outwardly guided electrical contact.

3. The fluid conduit as claimed in claim 1, wherein the pipe is plugged onto the connecting piece, and wherein the electrical connecting element is arranged on the connecting piece.

4. The fluid conduit as claimed in claim 1, wherein the ring has a nominal diameter which is smaller than an outside diameter of the connecting piece.

5. The fluid conduit as claimed in claim 1, wherein the electrical connecting element is arranged at an end side of the pipe between the pipe and the conduit connector.

6. The fluid conduit as claimed in claim 1, wherein the electrical connecting element has a flat plug.

7. The fluid conduit as claimed in claim 1, wherein the ring takes the form of a hollow cylinder.

8. The fluid conduit as claimed in claim 7, wherein the hollow cylinder has a conical inner shape.

9. The fluid conduit as claimed in claim 1, wherein the pipe is electrically conductive at least on its inner side and the electrical connecting element is electrically connected to the inner side.

10. The fluid conduit as claimed in claim 9, wherein an electrical connection extends between the electrical connecting element and the inner side of the pipe over the outer side of the conduit connector.

11. The fluid conduit as claimed in claim 9, wherein the pipe at least partially surrounds the electrical connecting element.

12. The fluid conduit as claimed in claim 11, wherein the electrical connecting element has a plug-on region whose outside diameter widens conically.

\* \* \* \* \*